Figure 1:
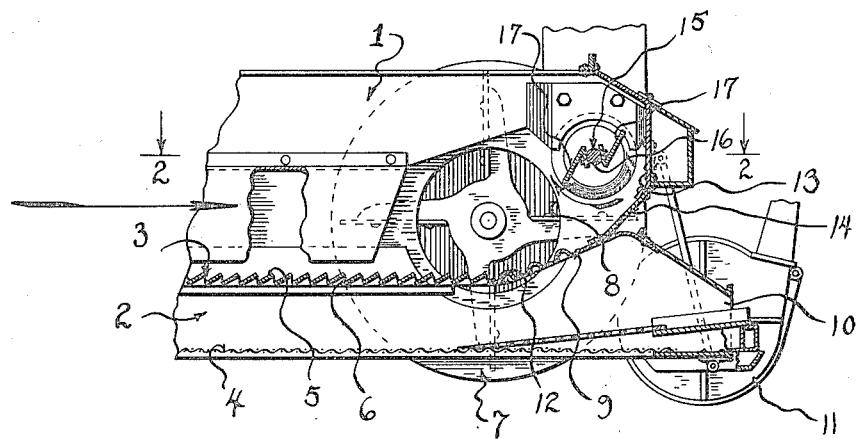

Dec. 19, 1939.   H. L. ROSENTHAL ET AL   2,184,083

CORN HUSKER AND SHREDDER

Filed Oct. 31, 1938

Inventors
Henry L. Rosenthal and
August Rosenthal

By

Attorneys.

Patented Dec. 19, 1939

2,184,083

UNITED STATES PATENT OFFICE 2,184,083

CORN HUSKER AND SHREDDER

Henry L. Rosenthal and August Rosenthal, Wauwatosa, Wis., assignors to Rosenthal Manufacturing Co., West Allis, Wis.

Application October 31, 1938, Serial No. 237,899

4 Claims. (Cl. 130—5)

This invention pertains to corn huskers and shredders of the general type disclosed in United States Letters Patent No. 1,886,906 and No. 1,917,996, in which the cut material is fed to the blower conveyor by a rapidly reciprocated trough.

One of the most serious problems, in connection with machines of the foregoing type, resides in the prevention of excessive accumulation of material at the blower opening and resultant clogging of the same.

To overcome the foregoing difficulty, numerous devices have been resorted to, such as disclosed in said Letters Patent, but they have proved impractical under certain conditions of material, such as excessive moisture, which causes the material to pack and mat. Others have attempted to feed material from the shaker trough to the blower by a snow conveyor, but this has proved to be objectionable in that there is no provision for regulating the feed of corn stalks to machines of the type in question, and consequently with a positive feed to the blower the same frequently becomes overloaded.

The present invention has primarily for its object to overcome the foregoing difficulties by the provision of novel means for directing material from the shaker trough to the blower opening, so that matting and excessive accumulation adjacent the blower opening is prevented, and the rate of feed is determined by the capacity of the fan.

Incidental to the foregoing, a more specific object of the present invention resides in the provision of a rotary beater positioned transversely of the shaker trough and rearwardly of the blower opening, to repel material at the rear of the shaker trough toward the axis of the blower opening.

A still further object of the present invention resides in the provision of perforations at the rear end of the shaker trough, formed by struck-up tongues directed toward the blower opening to increase the air circulation through the material toward said opening.

With the above and other objects in view which will appear as the description proceeds, the invention resides in the novel construction, combination, and arrangement of parts, substantially as hereinafter described and more particularly defined by the appended claims, it being understood that such changes in the precise embodiment of the herein disclosed invention may be made as come within the scope of the claims.

In the accompanying drawing one complete example of the physical embodiment of the present invention, constructed according to the best mode so far devised for the practical application of the principle thereof, is illustrated.

Figure 2:
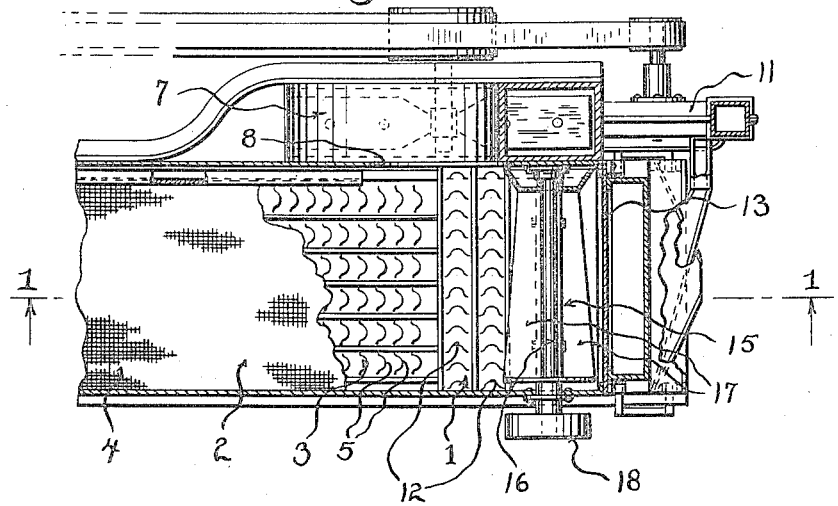

In the drawing:

Figure 1 is a fragmentary longitudinal section through the rear end of a corn husker and shredder incorporating the present invention, the same being taken on the line 1—1 of Figure 2; and Figure 2 is a section taken on the line 2—2 of Figure 1.

Referring now more particularly to the accompanying drawing, the numeral 1 designates generally the discharge end of a conventional type of corn husker provided with a reciprocated shaker trough 2, which comprises a main feeding screen 3, and an auxiliary separating screen 4 adapted to collect kernels of corn and sift out particles of dirt and foreign material. The feed screen 3 is preferably formed of sheet metal, and is provided throughout substantially its entire length with struck-up tongues 5, between which openings 6 are formed.

As best shown in Figure 1, the tongues 5 extend longitudinally of the shaker trough, whereby upon longitudinal reciprocation of the trough, the material delivered thereto is fed rearwardly in the direction indicated by the arrow in Figure 1, while dirt and loose kernels of corn pass through the openings 6 and are delivered to the collecting screen 4.

Mounted upon one side of the casing forming the discharge end of the machine, is a conventional blower conveyor 7, provided with an axial intake 8 communicating with the interior of the discharge end 1, and positioned just above the feed screen 3.

While the foregoing structure has been described in considerable detail, it will be understood that the same is conventional and forms no part of the present invention other than in the combination as hereinafter claimed.

As best shown in Figure 1, the rear end of the feed screen 3 is inclined upwardly at 9, and then downwardly toward the rear of the shaker trough to provide a discharge mouth 10, through which kernels collected upon the separator screen 4 are delivered to a pneumatic bagging mechanism 11.

The rear inclined portion 9 of the feed screen 3 is also provided with a series of struck-up tongues 12, similar to the tongues 5, but extending transversely of the shaker trough in the direction of the opening 8 communicating with the blower 7. Consequently, air drawn through the openings formed by the tongues 12 passes through the material contained on the screen, in the direction of the blower opening 8.

The rear wall 13 of the discharge end of the machine terminates above the shaker trough, and has secured thereto a depending flexible apron 14, the lower edge of which engages the inclined portion 9 of the screen 3, and because of the flexible character of the apron, the same permits reciprocation of the shaker trough and forms a closure for the rear end of the housing to prevent discharge of cut material over the rear end of the trough, and also prevents entrance of air through the rear end of the machine, to effect circulation through the cut material created by the blower fan.

Positioned within the discharge end 1, rearwardly of the blower opening 8, is a rotary beater 15, comprising a shaft 16, journaled in the sides of the frame, and provided with tangential longitudinal fins 17. One end of the shaft is provided with a belt pulley 18, by means of which the beater is rotated in clockwise direction with reference to Figure 1.

In operation the material delivered to the screen 3 is fed rearwardly within the discharge end 1, upon rapid reciprocation of the shaker trough 2, due to the fact that the tongues 5 engage the material upon rearward movement of the shaker trough, and pass under the same upon its forward movement. As the cut material reaches the rear end of the trough, naturally a portion of the same is drawn into the blower 7 through the opening 8. However, in instances of an excessive amount of material, or a moist condition of the same, the suction created by the blower is insufficient to draw the cut material into the same, and therefore, it has a tendency to pack and mat upon the screen adjacent the rear of the discharge end causing the same to mat and build up to the extent that it obstructs the opening 8, and the machine must then be stopped in order to clear the same.

To overcome the foregoing condition, the salient feature of the present invention resides in the provision of the rotary beater 15, and its relative position to the opening 9, both of which are essential to overcome the difficulty set forth.

It will be apparent that as the beater rotates in a clockwise direction, with reference to Figure 1, the fins 17 will engage and repel the material toward the axis of the blower opening 8, keeping the same agitated and fluffed so that accumulation or packing is impossible, and while the material is not positively fed into the blower, because of its loose fluffed condition the same is readily drawn into the blower by means of the circulation created by the fan. Obviously the volume of feed is controlled by the capacity of the blower; consequently, overloading is eliminated.

To state the advantages of the invention in another way, it might be explained that the cut material is fed toward the axis of the blower opening 8 from two directions, namely, the front and rear of the same. Consequently, such material as may pass the opening is returned toward the same from the rear, thus insuring withdrawal from the shaker trough into the blower.

It will also be apparent that the transversely directed tongues 12 facilitate and assist in the foregoing operation, inasmuch as the direct circulation of air through the material is toward the blower opening 8.

From the foregoing explanation, considered in connection with the accompanying drawing, it will be apparent that exceedingly simple, inexpensive, and novel means have been provided for effectively preventing the accumulation of the cut material at the rear of the shaker trough in a corn husker and shredder, and at the same time facilitating delivery of the cut material to the blower conveyor without overloading.

We claim:

1. In a corn husker and shredder having a reciprocative shaker trough and a blower conveyor positioned at one side of said trough, said blower having an inlet positioned above said trough for receiving material therefrom, and a rotary beater journaled transversely above said trough and rearwardly of said inlet to repel material toward the axis of said inlet and in a direction opposite to the feed of the shaker trough.

2. In a corn husker and shredder having a reciprocative shaker trough and a blower conveyor positioned at one side of said trough, said blower having an inlet positioned above said trough for receiving material therefrom, the top of said trough being inclined upwardly at its rear end, a flexible depending apron carried by the shredder housing and engaging said inclined portion, and a rotary beater journaled transversely above said trough and rearwardly of said blower inlet to repel material toward the axis of said inlet and in a direction opposite to the feed of the shaker trough.

3. In a corn husker and shredder having a reciprocative shaker trough and a blower conveyor positioned at one side of said trough, said blower having an inlet positioned above said trough for receiving material therefrom, the top of said trough being inclined upwardly at its rear end and provided with a series of jets directed laterally toward said blower inlet, a depending flexible apron carried by the shredder housing and engaging said inclined portion, and a rotary beater journaled transversely above said trough and rearwardly of said blower inlet to repel material toward the axis of said inlet and in a direction opposite to the feed of the shaker trough.

4. In a corn husker and shredder having a reciprocative shaker trough and a blower conveyor positioned at one side of said trough, said blower having an inlet positioned above said trough for receiving material therefrom, the top of said trough being provided with a series of transverse jets in alinement with said blower inlet and directed toward the same, and a rotary beater journaled transversely above said trough and rearwardly of said blower inlet to repel material toward the axis of said inlet and in a direction opposite to the feed of the shaker trough.

HENRY L. ROSENTHAL.
AUGUST ROSENTHAL.